US012680598B2

(12) United States Patent (10) Patent No.: US 12,680,598 B2
Mueller et al. (45) Date of Patent: Jul. 14, 2026

(54) DRIVE DEVICE FOR A HIGH PRESSURE CLEANING APPLIANCE

(71) Applicant: Alfred Kärcher SE & Co. KG, Winnenden (DE)

(72) Inventors: Wolfgang Mueller, Winnenden (DE); Thomas Maier, Winnenden (DE); Robert Nathan, Winnenden (DE); Manuel Kerkow, Winnenden (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 202 days.

(21) Appl. No.: 18/454,501

(22) Filed: Aug. 23, 2023

(65) Prior Publication Data

US 2023/0400088 A1 Dec. 14, 2023

Related U.S. Application Data

(63) Continuation of application No. PCT/EP2022/052082, filed on Jan. 28, 2022.

(30) Foreign Application Priority Data

Feb. 25, 2021 (DE) ..................... 10 2021 104 570.3

(51) Int. Cl.
F04B 37/12 (2006.01)
B08B 3/02 (2006.01)
(Continued)

(52) U.S. Cl.
CPC ............. F16H 37/124 (2013.01); B08B 3/02 (2013.01); F16H 57/043 (2013.01);
(Continued)

(58) Field of Classification Search
CPC .......... F04B 1/146; F04B 17/03; F04B 1/145; F04B 19/04; F04B 1/128; F16H 37/124;
(Continued)

(56) References Cited

U.S. PATENT DOCUMENTS 5,494,414 A 2/1996 Steinhart et al.
5,916,348 A 6/1999 Lanfredi
(Continued)

FOREIGN PATENT DOCUMENTS

CN 104776004 A 7/2015
CN 106032794 A 10/2016
(Continued)

OTHER PUBLICATIONS

Machine translation of WO-2007065799-A1. (Year: 2007).*
Machine translation of WO-2020220504-A1. (Year: 2020).*

*Primary Examiner* — Randell J Krug
(74) *Attorney, Agent, or Firm* — Womble Bond Dickinson (US) LLP

(57) ABSTRACT

A drive device for a high pressure cleaning appliance includes a motor, the motor shaft of which is rotatably mounted on a motor flange and is coupled to a swash plate arrangement by a planetary gearing, wherein the planetary gearing comprises a sun gear, which is connected to the motor shaft in a rotationally-fixed manner and meshes with planetary gears that are rotatably mounted on a planet carrier and are in engagement with an internally toothed ring gear, and wherein the swash plate arrangement is positioned in an oil housing. So that the drive device has a longer service life and enables a greater selection of materials in the production thereof, the motor flange and the oil housing form separate components, wherein the motor flange comprises the ring gear and the oil housing is fixed to the motor flange, wherein the motor flange forms a centering for the oil housing.

17 Claims, 6 Drawing Sheets

(51) Int. Cl.

| | |
|---|---|
| *F16H 37/12* | (2006.01) |
| *F16H 57/04* | (2010.01) |
| *F16H 57/08* | (2006.01) |
| *F04B 1/128* | (2020.01) |
| *F04B 17/03* | (2006.01) |
| *F04B 19/04* | (2006.01) |

(52) U.S. Cl.
CPC ....... *F16H 57/045* (2013.01); *F16H 57/0486* (2013.01); *F16H 57/082* (2013.01); *B08B 2203/0223* (2013.01); *B08B 2203/0294* (2013.01); *F04B 1/128* (2013.01); *F04B 17/03* (2013.01); *F04B 19/04* (2013.01)

(58) Field of Classification Search
CPC .. F16H 57/082; F16H 57/0486; F16H 57/045; F16H 57/043; B08B 3/02; B08B 2203/0294; B08B 2203/0223
See application file for complete search history.

(56) References Cited

U.S. PATENT DOCUMENTS

| | | | | |
|---|---|---|---|---|
| 7,874,815 B2 * | 1/2011 | Wesch | ............... | F16H 57/0421 417/372 |
| 9,494,144 B2 * | 11/2016 | Nathan | ................... | F04B 53/16 |

| | | | | |
|---|---|---|---|---|
| 2004/0016821 A1 | 1/2004 | Reverberi et al. | | |
| 2004/0165996 A1 | 8/2004 | Lanfredi | | |
| 2006/0024173 A1 | 2/2006 | Rocchi et al. | | |
| 2006/0110265 A1 * | 5/2006 | Lanfredi | ................. | F04B 1/295 417/269 |
| 2019/0345919 A1 | 11/2019 | Ruch et al. | | |

FOREIGN PATENT DOCUMENTS

| | | | | |
|---|---|---|---|---|
| DE | 43 38 896 A1 | 6/1994 | | |
| DE | 296 04 364 U1 | 7/1997 | | |
| DE | 296 16 143 U1 | 1/1998 | | |
| DE | 298 11 966 U1 | 10/1998 | | |
| DE | 10 2005 009 311 A1 | 8/2006 | | |
| DE | 10 2007 006 284 A1 | 8/2008 | | |
| DE | 10 2007 049 223 A1 | 4/2009 | | |
| DE | 10 2008 028 796 A1 | 12/2009 | | |
| DE | 10 2008 028 798 A1 | 12/2009 | | |
| DE | 10 2008 048 019 A1 | 3/2010 | | |
| DE | 10 2008 051 433 A1 | 4/2010 | | |
| DE | 20 2012 009 130 U1 | 9/2013 | | |
| WO | WO 00/08335 A1 | 2/2000 | | |
| WO | WO 2006/122642 | 11/2006 | | |
| WO | WO 2007/065799 | 6/2007 | | |
| WO | WO-2007065799 A1 * | 6/2007 | ............. | F16C 19/50 |
| WO | WO 2009/083154 | 7/2009 | | |
| WO | 2020220506 A1 | 11/2020 | | |
| WO | WO-2020220504 A1 * | 11/2020 | ............. | B08B 3/026 |

* cited by examiner

DRIVE DEVICE FOR A HIGH PRESSURE CLEANING APPLIANCE

CROSS-REFERENCE TO RELATED APPLICATIONS

This application is a continuation of international application number PCT/EP2022/052082, filed on Jan. 28, 2022, and claims the benefit of German application number 10 2021 104 570.3, filed on Feb. 25, 2021, which are incorporated herein by reference in their entirety and for all purposes.

BACKGROUND OF THE INVENTION

The invention relates to a drive device for a high pressure cleaning appliance, comprising a motor, the motor shaft of which is rotatably mounted on a motor flange and is coupled to a swash plate arrangement by way of a planetary gearing, wherein the planetary gearing comprises a sun gear, which is connected to the motor shaft in a rotationally-fixed manner and meshes with planetary gears that are rotatably mounted on a planet carrier and are in engagement with an internally toothed ring gear, and wherein the swash plate arrangement is positioned in an oil housing.

The piston pump of a high pressure cleaning appliance can be driven by means of such a drive device. The swash plate arrangement converts the rotational movement of the motor shaft into a reciprocating movement of the pistons of the piston pump. The motor shaft defines a longitudinal axis of the drive device, and the pistons are able to abut against a contact face of the swash plate arrangement that is oriented obliquely to the longitudinal axis. Piston pumps of that kind are known to the person skilled in the art. The swash plate arrangement is coupled to the motor shaft by way of a planetary gearing, for example it may be connected to a planet carrier on which a plurality, preferably two or three, planetary gears are rotatably mounted. The planetary gears are in engagement, on the one hand, with a sun gear that is connected to the motor shaft in a rotationally-fixed manner and, on the other hand, with an internally toothed ring gear surrounding the planetary gears.

A drive device of the kind stated at the outset is known, e.g., from WO 2009/083154 A2 and DE 10 2005 009 311 A1. Moreover, such drive devices are also disclosed to the person skilled in the art in US 2004/0016821 A1.

In accordance with an embodiment of the invention, a drive device of the kind stated at the outset is further developed in such a way that it has a longer service life and enables a greater selection of materials in the production of said drive device.

SUMMARY OF THE INVENTION

In accordance with an embodiment of the invention, a drive device of the generic type is provided in which the motor flange and the oil housing form separate components, wherein the motor flange comprises the ring gear and the oil housing is fixed to the motor flange, wherein the motor flange forms a centering for the oil housing.

In the drive device in accordance with the invention, the motor flange and the oil housing form separate components, wherein the oil housing is fixed to the motor flange, which forms a centering for the oil housing, i.e. the motor flange centers the oil housing. Different materials may be used for the production of the motor flange and the oil housing, for example aluminum, die-cast, or plastic materials. By means of the different material pairings, the thermal properties of the drive device can be adapted in a simple manner to different performance classes of the high pressure cleaning appliance. The materials used for the oil housing and the motor flange can be optimized with regard to a longer service life of the drive device. Despite the configuration in the form of separate components, the assembly of the oil housing on the motor housing is very simple because the motor flange forms a centering for the oil housing. By means of the motor flange, the oil housing can be centered relative to the longitudinal axis of the drive device in a simple manner.

The oil housing is preferably connected to the motor flange in a positive-locking manner.

It is favorable if the motor flange and the oil housing have interengaging positive-locking elements. This facilitates the assembly of the oil housing on the motor flange.

In an advantageous embodiment of the drive device in accordance with the invention, the motor flange comprises an annular groove and the oil housing comprises a collar, wherein the collar dips into the annular groove in an exactly fitting manner.

The oil housing is favorably fixable to the motor flange with the interposition of at least one sealing ring. The sealing ring prevents the leakage of oil in the region between the oil housing and the motor flange.

In a preferred embodiment of the drive device in accordance with the invention, the swash plate arrangement comprises a swash body, wherein arranged on the front side of the swash body pointing away from the motor flange is a front bearing ring on which a pressure plate is supported by way of front rolling bodies, and wherein arranged on the rear side of the swash body pointing toward the motor flange is a rear bearing ring, which is supported by way of rear rolling bodies on a support ring held on the oil housing. The pressure plate, like the front bearing ring, is oriented obliquely to the longitudinal axis of the drive device and forms a contact face for the pistons of the piston pump of the high pressure cleaning appliance. The pistons may be resiliently biased in the direction toward the contact face, such that in the case of a rotational movement of the swash body about the longitudinal axis of the drive device they are driven to a reciprocating movement oriented in parallel to the longitudinal axis. The pressure plate is supported by way of front rolling bodies on the front bearing ring, which is supported by the swash body on the front side of which the front bearing ring is arranged. The swash body, in turn, is supported in the axial direction by way of the rear bearing ring and the rear rolling bodies on the support ring, which, in turn, is supported by the oil housing. A configuration of that kind gives the swash plate arrangement a high mechanical strength and increases the service life of the drive device.

It is advantageous if the swash body comprises at least one front centering element and at least one rear centering element, wherein the at least one front centering element centers the front bearing ring, and wherein the at least one rear centering element centers the rear bearing ring.

The at least one front centering element preferably passes through the front bearing ring.

It is favorable if the pressure plate is of annular configuration and the at least one front centering element passes through the pressure plate. In an embodiment of that kind, the at least one front centering element makes it possible to center and guide not only the front bearing ring but also the pressure plate.

In a preferred embodiment of the invention, the at least one rear centering element passes through the rear bearing ring.

It is favorable if the front bearing ring is pressed onto the at least one front centering element and/or if the rear bearing ring is pressed onto the at least one rear centering element.

It is advantageous if the swash body comprises a front centering element, which forms a cylindrical sleeve that on the side pointing away from the motor flange projects from a base part of the swash body and whose central axis is inclined relative to the longitudinal axis of the drive device.

It is favorable if the swash body comprises a rear centering element, which forms a cylindrical collar that on the side pointing toward the motor flange projects from the base part of the swash body and that is oriented coaxially to the longitudinal axis of the drive device.

In an advantageous embodiment of the invention, the swash body comprises a projection, which at least partially surrounds the front bearing ring and preferably also the pressure plate in the circumferential direction.

The projection preferably projects from the base part of the swash body on the side pointing away from the motor flange.

The projection may be configured, e.g., as a collar-shaped ring segment, which is oriented coaxially to the central axis of the cylindrical sleeve and extends in the circumferential direction over a partial region of the front bearing ring and preferably also of the pressure plate.

The projection preferably extends over an angular range of about 90° to 150°, in particular 120°.

The base part is preferably configured as a base plate.

It is advantageous if the oil housing forms a receptacle into which the support ring dips, wherein the receptacle supports the support ring in the axial and radial direction.

The receptacle preferably comprises a cylindrical outer surface and a planar base surface, the outer surface surrounding the support ring in the circumferential direction and being oriented coaxially to the longitudinal axis of the drive device, and wherein the base surface is positioned in a plane oriented perpendicularly to the longitudinal axis of the drive device. The outer surface supports the support ring in the radial direction and the base surface supports the support ring in the axial direction.

The support ring is preferably pressed into or placed into the receptacle.

The swash body is favorably connected to the planet carrier in a rotationally-fixed manner.

It is advantageous if the swash body is connected to the planet carrier in a positive-locking manner.

Provision may be made, for example, that the swash body comprises a non-circular perforation into which a connecting portion of the planet carrier configured complementary to the perforation dips.

The non-circular perforation is preferably of star-shaped or profiled configuration, in particular polygonal configuration.

In a preferred embodiment of the invention, the swash body comprises a hollow cone, which is oriented coaxially to the longitudinal axis of the drive device and into which a connecting portion of the planet carrier configured complementary to the hollow cone dips. The hollow cone of the swash body in combination with the complementarily formed connecting portion of the planet carrier enables a centering of the planet carrier coaxially to the longitudinal axis of the drive device, i.e. coaxially to the motor shaft.

The planet carrier preferably comprises a hollow shaft, which passes through the swash body. By way of the hollow shaft, oil located in the oil housing can travel from the front side of the swash body pointing away from the motor flange to the planet carrier.

It is particularly advantageous if the hollow shaft protrudes out of the swash body in the direction pointing away from the motor flange. In such an embodiment of the invention, the hollow shaft forms with its end region pointing away from the motor flange an oil conveying pipe, which is able to dip into an oil sump when the drive device is operated with the longitudinal axis oriented substantially vertically, the oil housing being arranged below the motor. The oil is able to be conveyed via the oil conveying pipe from the oil sump to the planetary gearing.

In an advantageous embodiment of the invention, the swash body comprises at least one through-opening, which forms a flow path for oil, such that said oil is able to travel from the front side of the swash body pointing away from the motor flange to the rear side of the swash body pointing toward the motor flange. In particular, the oil is able to travel from the front side of the swash body via the at least one through-opening to the rear bearing ring, the rear rolling bodies, and the support ring.

The swash body is favorably axially fixed to the planet carrier. The axial fixing can be achieved, e.g., by means of a securing ring, a spring disc or toothed disc or, for example, by means of a bolt.

The subsequent description of an advantageous embodiment of the invention serves in conjunction with the drawing for further explanation.

DETAILED DESCRIPTION OF THE INVENTION

Figure 1:
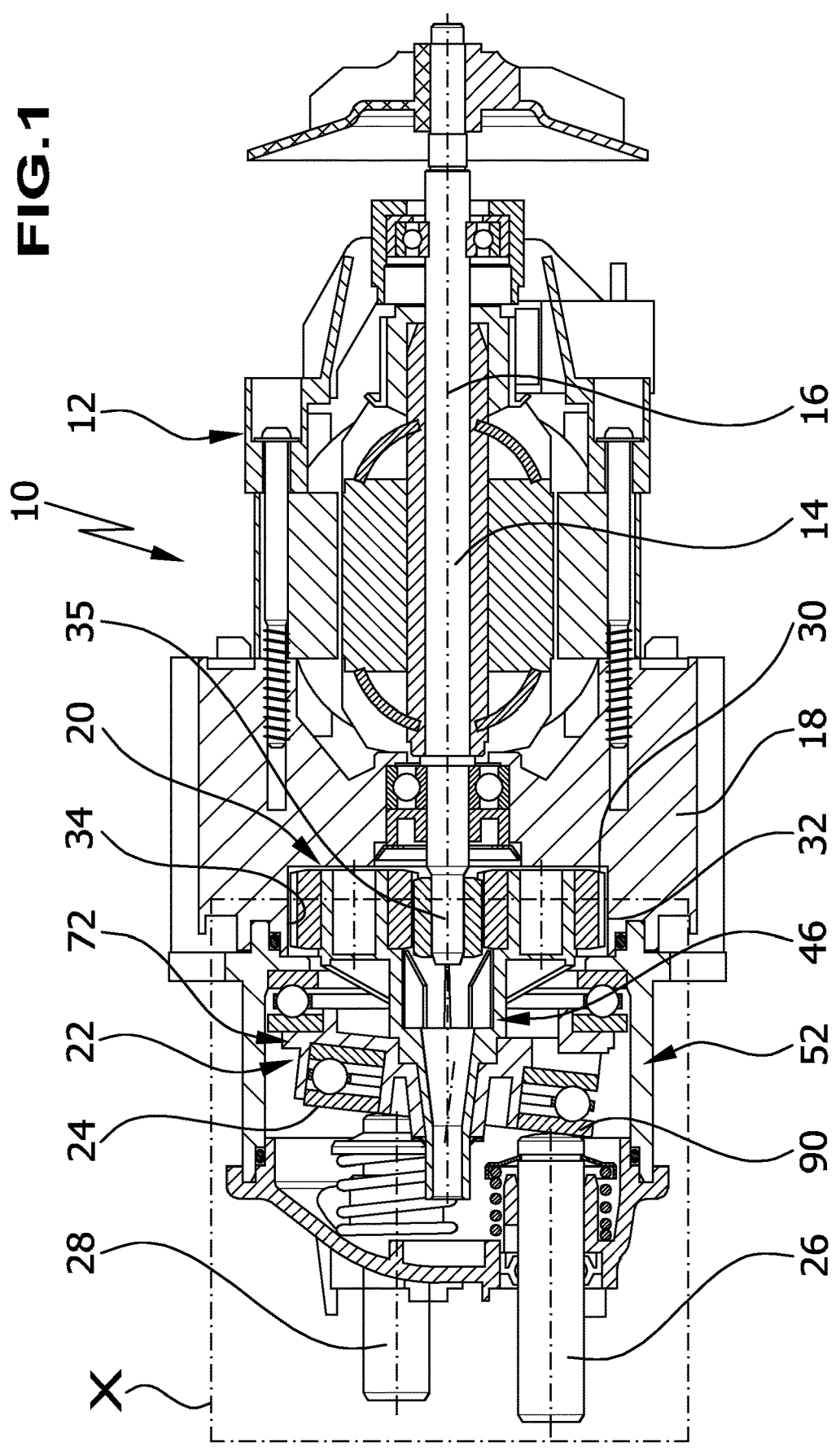
FIG. 1 shows a schematic section view of a drive device for a high pressure cleaning appliance.

Schematically depicted in the drawing is a preferred embodiment of a drive device in accordance with the invention for a high pressure cleaning appliance. The drive device is denoted as a whole with the reference numeral 10. The piston pump of a high pressure cleaning appliance can be driven by means of the drive device 10.

The drive device 10 comprises an electric motor 12 with a motor shaft 14, which defines a longitudinal axis 16 of the drive device 10 and is rotatably mounted on a motor flange 18. The motor shaft 14 is coupled to a swash plate arrangement 22 by way of a planetary gearing 20. The swash plate arrangement 22 forms a planar contact face 24 that is inclined relative to the longitudinal axis 16. Pistons 26, 28 of the piston pump of the high pressure cleaning appliance, which is known per se, are able to abut against the contact face 24. The pistons 26, 28 may be resiliently biased in the direction of the contact face 24. As a result of the wobbling motion of the contact face 24, the pistons 26, 28 are moved in a reciprocating manner in parallel to the longitudinal axis 16.

Figure 2:
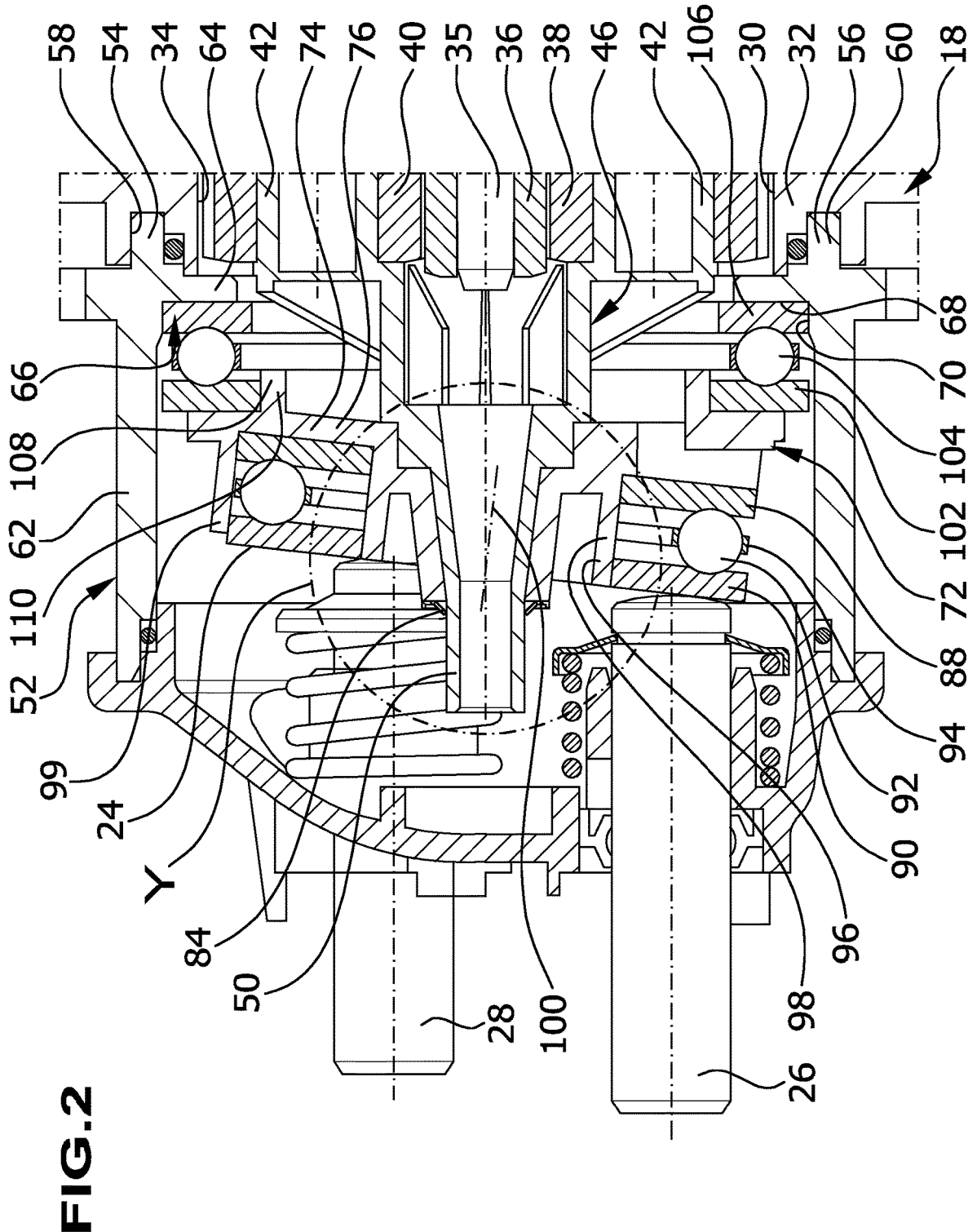
FIG. 2 shows an enlarged section view of detail X in FIG. 1.
Figure 3:
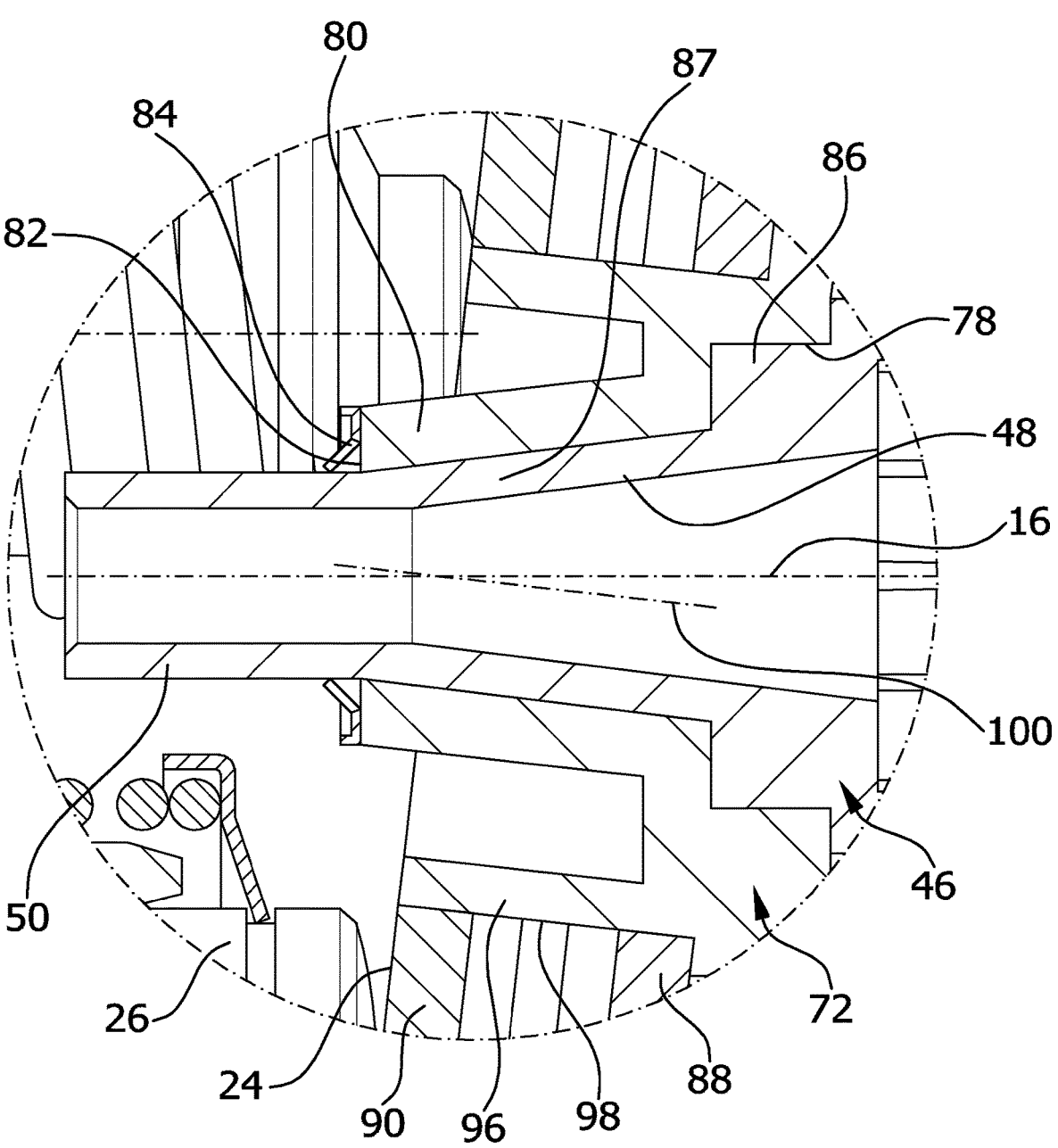
FIG. 3 shows an enlarged section view of detail Y in FIG. 2.
Figure 4:
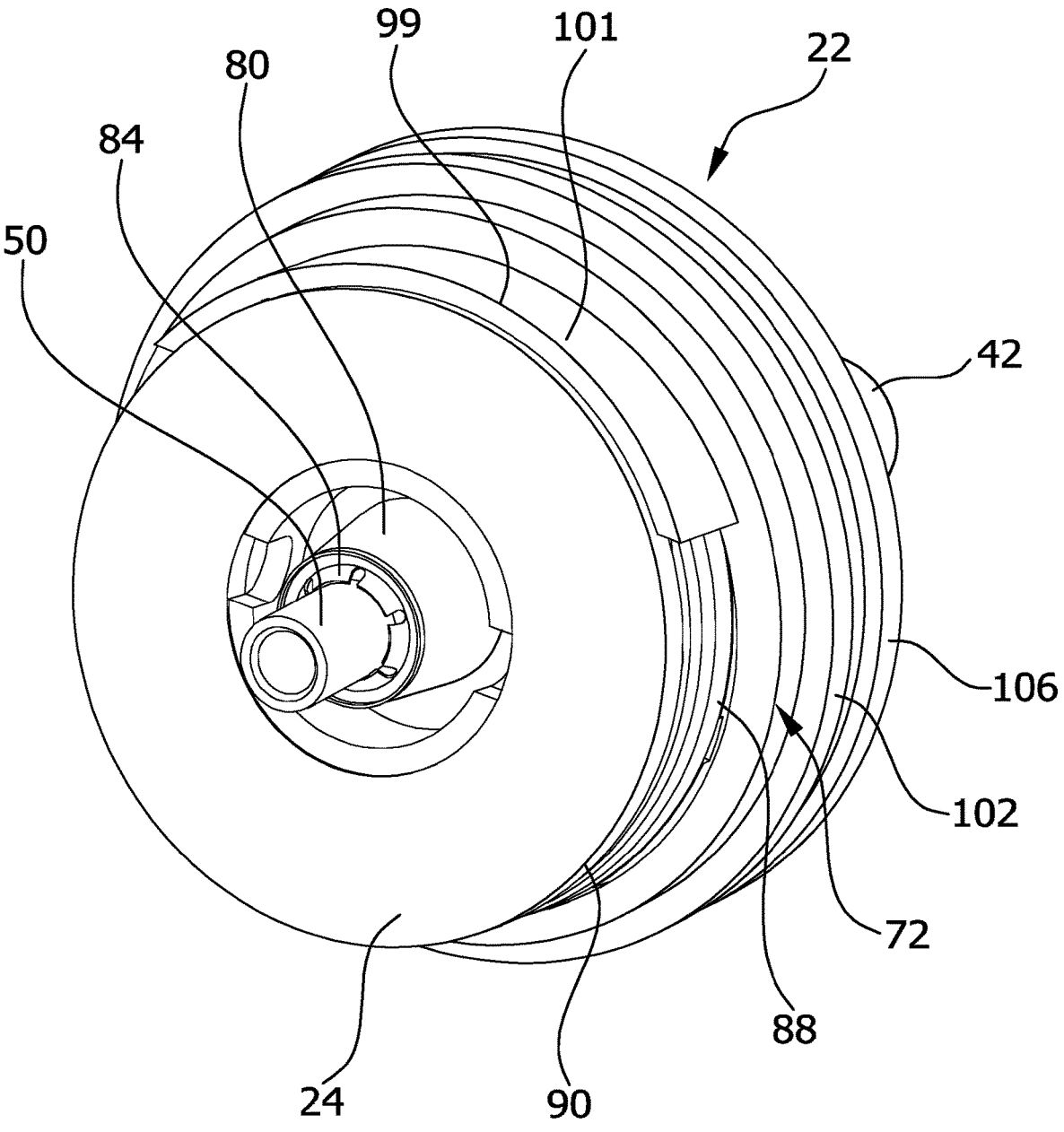
FIG. 4 shows a perspective depiction of a swash plate arrangement of the drive device from FIG. 1.

The motor flange 18 comprises a recess 30 pointing toward the swash plate arrangement 22, with a cylindrical circumferential wall 32 that forms an internally toothed ring gear 34. The motor shaft 14 protrudes with an end portion 35 into the recess 30 and bears a central sun gear 36 of the planetary gearing 20 in a rotationally-fixed manner, said sun gear 36 meshing with a plurality of planetary gears, wherein two planetary gears 38, 40 can be seen in FIGS. 1 and 2. The planetary gears 38, 40 are in engagement with the sun gear 36 one the one hand and with the internally toothed ring gear 34 oriented coaxially to the sun gear 30 on the other hand.

The planetary gears 38, 40 are each rotatably held on a bearing pin 42. The identically configured bearing pins 42 form part of a planet carrier 46 of the planetary gearing 20, wherein they are connected in one piece to a hollow shaft 48 of the planet carrier 46 oriented coaxially to the longitudinal axis 16. The hollow shaft 48 passes through the swash plate arrangement 22 and protrudes with a tubular end portion 50 out of the swash plate arrangement 22 in the direction pointing away from the motor flange 18.

The swash plate arrangement 22 is surrounded in the circumferential direction by an oil housing 52, which dips with a first positive-locking element 56 configured as a collar 54 into a second positive-locking element 60 of the motor flange 18 configured as an annular groove 58 in an exactly fitting manner. The annular groove 58 forms a centering of the oil housing 52 relative to the longitudinal axis 16 of the drive device 10.

The oil housing 52 comprises a cylindrical annular wall 62, which surrounds the swash plate arrangement 22 in the circumferential direction and transitions into the collar 54 by way of a radially inwardly directed shoulder 64. The shoulder 64 in combination with a portion of the annular wall 62 directly adjoining the shoulder 64 forms a receptacle 66 of the oil housing 52. The side of the shoulder 64 pointing away from the motor flange 18 forms a planar base surface 68 of the receptacle 66 and the portion of the annular wall 62 directly adjoining the shoulder 64 forms a cylindrical outer surface 70 of the receptacle 66.

Figure 6:
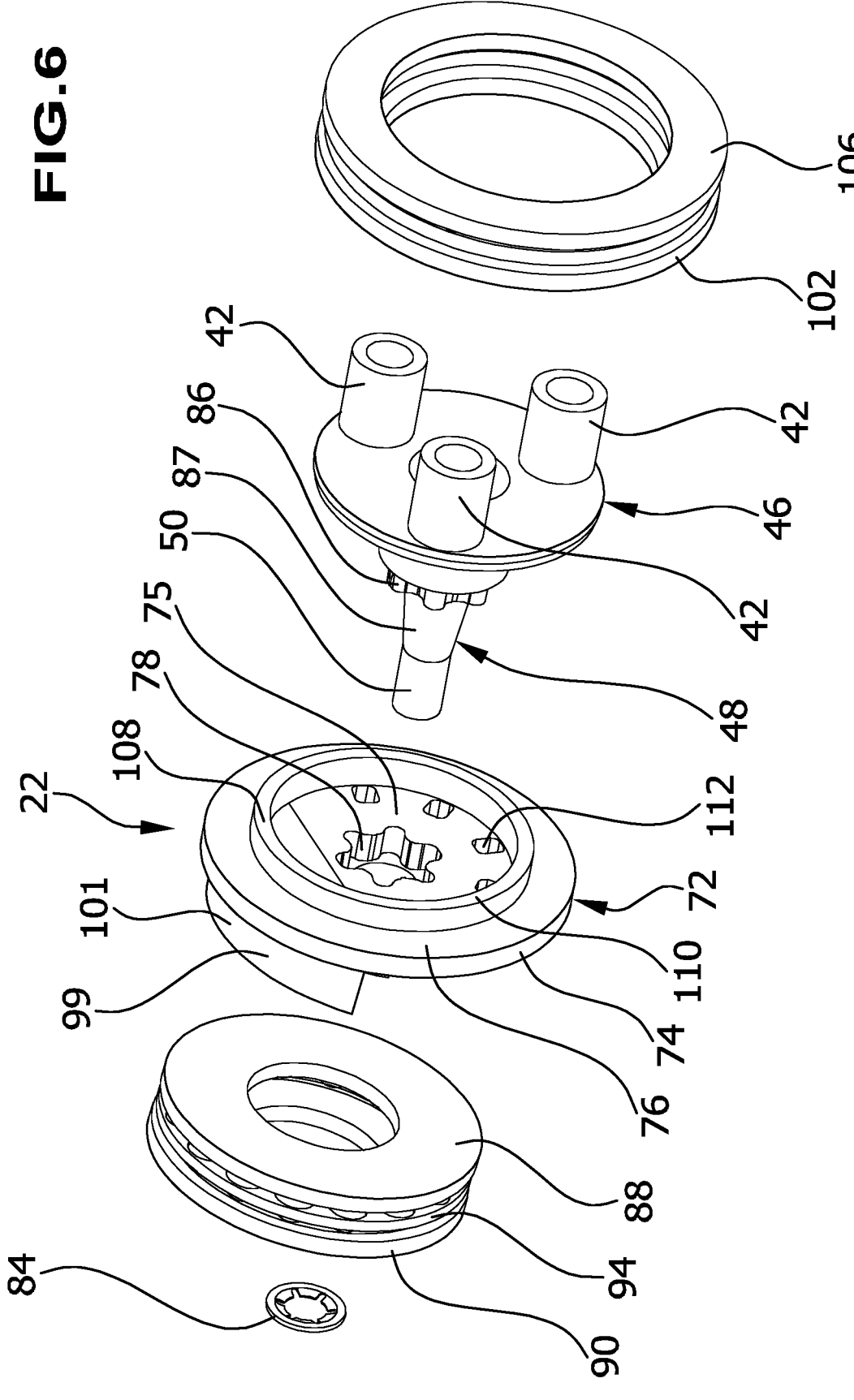
FIG. 6 shows a perspective depiction of the swash plate arrangement from FIG. 3 in the manner of an exploded view obliquely from the rear.

The swash plate arrangement 22 comprises a swash body 72, which comprises a base part 74 in the form of a base plate 76. The base plate 76 comprises a non-circular perforation 78. The perforation 78 is thus not of circular configuration. In the depicted embodiment, the perforation 78 is of star-shaped configuration. This is made clear in FIG. 6. In the direction pointing away from the motor flange 18, the perforation 78 is adjoined by a hollow cone 80 of the swash body 72 oriented coaxially to the longitudinal axis 16, said hollow cone 80 bearing on its end face 82 pointing away from the motor flange 18 a securing element in the form of a spring disc 84. The spring disc 84 interacts with the tubular end portion 50 of the planet carrier 46, such that the swash body 72 is axially fixed to the planet carrier 46 by means of the spring disc 84.

Figure 5:
FIG. 5 shows a perspective depiction of the swash plate arrangement from FIG. 4 in the manner of an exploded view obliquely from the front.

The planet carrier 46 passes with its hollow shaft 48 through the perforation 78 and the hollow cone 80, wherein a first connecting portion 86 of the hollow shaft 48 configured complementary to the perforation 78 passes through the perforation 78 in an exactly fitting manner and a second connecting portion 87 configured complementary to the hollow cone 80 passes through the hollow cone 80 in an exactly fitting manner. In the embodiment depicted, the first connecting portion 86 has a star-shaped outer contour and the second connecting portion 87 has a cone-shaped outer contour. This is clear, in particular, in FIGS. 5 and 6. The swash body 72 is connected to the planet carrier 46 in a rotationally-fixed manner by way of the first connecting portion 86 and the perforation 78. The second connecting portion 87 in combination with the hollow cone 80 centers the planet carrier 46 relative to the longitudinal axis 16 of the drive device 10.

A front bearing ring 88 is arranged on the front side 73 of the swash body 72 pointing away from the motor flange 18. The front bearing ring 88 is of planar configuration and is inclined relative to the longitudinal axis 16. An annular pressure plate 90 oriented in parallel to the front bearing ring 88 is supported on the front bearing ring 88 by way of front rolling bodies 92. The pressure plate 90 forms the afore-mentioned contact face 24 against which the pistons 26, 28 abut.

The front rolling bodies 92 are arranged in a rolling body cage 94, which is positioned between the front bearing ring 88 and the pressure plate 90 and which, as well as the front bearing ring 88 and the pressure plate 90, is passed through by a front centering element 98 configured as a cylindrical sleeve 96. The sleeve 96 projects from the base plate 76 on the side pointing away from the motor flange 18, wherein the central axis 100 of the sleeve 96 is inclined relative to the longitudinal axis 16. By means of the sleeve 96, the front bearing ring 88, the pressure plate 90, and the rolling body cage 94 are centered relative to the central axis 100.

Oriented at a radial distance from the sleeve 96 and coaxially to the central axis 100 thereof, a projection 99 in the form of a collar-shaped ring segment 101 is arranged on the side of the base plate 76 pointing away from the motor flange 18, said ring segment 101 partially surrounding the front bearing ring 88, the rolling body cage 94, and the pressure plate 90 in the circumferential direction. The projection 101 extends over an angular range of about 120° and forms a lateral stop for the bearing ring 88, the rolling body cage 94, and the pressure plate 90.

Arranged on the rear side 75 of the swash body 72 pointing toward the motor flange 18 is a rear bearing ring 102, which is supported on a support ring 106 by way of rear rolling bodies 104. The support ring 106 is accommodated by the receptacle 66 of the oil housing 52, which supports the support ring 106 in the axial direction and in the radial direction.

The rear bearing ring 102 is passed through by a rear centering element 110, which is configured as a cylindrical collar 108 and which centers the rear bearing ring 102 relative to the longitudinal axis 16. The collar 108 is oriented coaxially to the longitudinal axis 16 and projects from the side of the base plate 76 pointing toward the motor flange 18.

The base plate 76 of the swash body 72 comprises a plurality of through-openings 112, which form a flow path for oil, such that the oil is able to travel from the front side 73 of the swash body 72 pointing away from the motor flange 18 to the rear side 75 of the swash body 72 pointing toward the motor flange 18.

Unhindered by the swash body 72, oil is able to also travel via the hollow shaft 48 of the planet carrier 46 to the recess 30 of the motor flange 18 in which the sun gear 36, the planetary gears 38, 40, and the ring gear 34 are arranged.

The oil housing 52 is preferably made of an aluminum material, a die-cast material, in particular die-cast zinc, or of a plastic material. The motor flange 18 is preferably made of metal or a plastic material, and the swash body 72 is preferably also made of an aluminum material, a die-cast material, in particular die-cast zinc, or a plastic material. The configuration of the oil housing 52 and the motor flange 18 as separate components makes it possible to produce these components from different materials. For example, the oil housing 52 may consist of different materials, depending on the performance class of the high pressure cleaning appliance. The same applies for the swash body 72, which can be produced from different materials depending on the performance class of the high pressure cleaning appliance.

In the embodiment depicted, the swash body 72 is axially fixed to the planet carrier 46 by means of the spring disc 84. Alternatively, other securing elements may also be used, in particular a bolt or a securing ring. Provision may also be made that the swash plate 72 is screwed to the planet carrier 46.

The invention claimed is:

1. A drive device for a high pressure cleaning appliance, the drive device comprising:

a motor, a motor shaft of which is rotatably mounted on a motor flange and is coupled to a swash plate arrangement by way of a planetary gearing, wherein the planetary gearing comprises a sun gear, which is connected to the motor shaft in a rotationally fixed manner and meshes with planetary gears that are rotatably mounted on a planet carrier and are in engagement with an internally toothed ring gear, and wherein the swash plate arrangement is positioned in an oil housing, wherein the motor flange and the oil housing form separate components, wherein the motor flange comprises the ring gear and the oil housing is fixed to the motor flange, wherein the motor flange forms a centering for the oil housing, wherein the swash plate arrangement comprises a swash body, wherein arranged on a front side of the swash body pointing away from the motor flange is a front bearing ring on which a pressure plate is supported by way of front rolling bodies, and wherein arranged on a rear side of the swash body pointing toward the motor flange is a rear bearing ring, which is supported by way of rear rolling bodies on a support ring held on the oil housing, wherein the swash body comprises at least one front centering element and at least one rear centering element, wherein the at least one front centering element centers the front bearing ring, and wherein the at least one rear centering element centers the rear bearing ring, and wherein the at least one front centering element passes through the front bearing ring.

2. The drive device in accordance with claim 1, wherein the oil housing is connected to the motor flange in a positive-locking manner.

3. The drive device in accordance with claim 1, wherein the motor flange and the oil housing comprise interengaging positive-locking elements.

4. The drive device in accordance with claim 1, wherein the motor flange comprises an annular groove, and wherein the oil housing comprises a collar, which extends into the annular groove in an exactly fitting manner.

5. The drive device in accordance with claim 1, wherein the pressure plate is of annular configuration and the at least one front centering element passes through the pressure plate.

6. The drive device in accordance with claim 1, wherein the at least one rear centering element passes through the rear bearing ring.

7. The drive device in accordance with claim 1, wherein the swash body comprises a projection, which at least partially surrounds the front bearing ring and also the pressure plate in the circumferential directions.

8. The drive device in accordance with claim 1, wherein the oil housing forms a receptacle into which the support ring extends, wherein the receptacle supports the support ring in the axial and radial direction.

9. The drive device in accordance with claim 1, wherein the swash body comprises a hollow cone, which is oriented coaxially to the longitudinal axis of the drive device and into which a connecting portion of the planet carrier that is formed complementary to the hollow cone extends.

10. The drive device in accordance with claim 1, wherein the swash body comprises at least one through-opening, which forms a flow path for oil from the front side pointing away from the motor flange to the rear side of the swash body pointing toward the motor flange.

11. The drive device in accordance with claim 1, wherein the swash body is axially fixed to the planet carrier.

12. The drive device in accordance with claim 1, wherein the front centering element forms a cylindrical sleeve that on the side pointing away from the motor flange projects from a base part of the swash body and whose central axis is inclined relative to the longitudinal axis of the drive device.

13. The drive device in accordance with claim 12, wherein the rear centering element forms a cylindrical collar that on the side pointing toward the motor flange projects from the base part of the swash body and is oriented coaxially to the longitudinal axis.

14. The drive device in accordance with claim 1, wherein the swash body is connected to the planet carrier in a positive-locking manner.

15. The drive device in accordance with claim 14, wherein the swash body comprises a non-circular perforation, into which a connecting portion of the planet carrier that is formed complementary to the perforation extends in an exactly fitting manner.

16. The drive device in accordance with claim 1, wherein the planet carrier comprises a hollow shaft, which passes through the swash body.

17. The drive device in accordance with claim 16, wherein the hollow shaft protrudes out of the swash body in the direction pointing away from the motor flange.

* * * * *